US010203006B2

(12) United States Patent
Miyake et al.

(10) Patent No.: US 10,203,006 B2
(45) Date of Patent: Feb. 12, 2019

(54) SELECTABLE ONE-WAY CLUTCH

(71) Applicant: TOYOTA JIDOSHA KABUSHIKI KAISHA, Toyota-shi, Aichi-ken (JP)

(72) Inventors: Kouhei Miyake, Susono (JP); Yuki Kurosaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 94 days.

(21) Appl. No.: 15/245,573

(22) Filed: Aug. 24, 2016

(65) Prior Publication Data

US 2017/0067517 A1    Mar. 9, 2017

(30) Foreign Application Priority Data

Sep. 4, 2015    (JP) .................. 2015-174785

(51) Int. Cl.
*F16D 41/12*    (2006.01)
*F16D 41/02*    (2006.01)

(52) U.S. Cl.
CPC ........... *F16D 41/125* (2013.01); *F16D 41/02* (2013.01); *F16D 2300/06* (2013.01)

(58) Field of Classification Search
None
See application file for complete search history.

(56) References Cited

U.S. PATENT DOCUMENTS

| | | | |
|---|---|---|---|
| 5,918,715 A | 7/1999 | Ruth et al. | |
| 6,577,033 B1 | 6/2003 | Sekine | |
| 2008/0135369 A1* | 6/2008 | Meier | B21D 53/12 192/107 R |
| 2013/0277164 A1* | 10/2013 | Prout | F16D 25/061 192/69.9 |
| 2015/0105205 A1 | 4/2015 | Kurosaki et al. | |
| 2016/0265605 A1 | 9/2016 | Tomita et al. | |

FOREIGN PATENT DOCUMENTS

| | | |
|---|---|---|
| JP | 2000-065097 A | 3/2000 |
| JP | 2000179643 A | 6/2000 |
| JP | 2000-320580 A | 11/2000 |
| JP | 2002-504979 A | 2/2002 |
| JP | 2015-077846 A | 4/2015 |

* cited by examiner

*Primary Examiner* — Jacob S. Scott
(74) *Attorney, Agent, or Firm* — Hunton Andrews Kurth LLP

(57) ABSTRACT

A selectable one-way clutch includes a pocket plate formed with a plurality of recessed receptacles on one face thereof, a notch plate arranged so as to oppose the face of the pocket plate on which the recessed receptacle is formed and capable of relatively rotating with respect to the pocket plate, an engagement recessed portion formed on a face of the notch plate corresponding to the recessed receptacle, a plate-shaped engagement piece received in the recessed receptacle, and an elastic member arranged between a bottom portion of the recessed receptacle and the engagement piece and biasing the engagement piece toward a side of the notch plate. An oil passage that discharges lubricant oil to a side of the recessed receptacle from a side of the engagement recessed portion is formed at the engagement piece.

6 Claims, 5 Drawing Sheets

SELECTABLE ONE-WAY CLUTCH

CROSS-REFERENCE TO RELATED APPLICATION(S)

The present application claims priority to and incorporates by reference the entire contents of Japanese Patent Application No. 2015-174785 filed in Japan on Sep. 4, 2015.

BACKGROUND OF THE DISCLOSURE

1. Field of the Disclosure

The present disclosure relates to a selectable one-way clutch.

2. Description of the Related Art

A selectable one-way clutch has been known as a one-way clutch such as one in which a selector plate arranged between a pocket plate and a notch plate is capable of switching a strut (engagement piece) in the pocket plate and a notch (engagement recessed portion) in the notch plate between an engagement state and a non-engagement state. For example, Japanese Laid-open Patent Publication No. 2015-077846 discloses a selectable one-way clutch used as a brake mechanism for overdrive (OD) lock-up, in which the inside thereof is provided with lubricant oil.

Here, the selectable one-way clutch enters the engagement state when the strut in the pocket plate is engaged with the notch in the notch plate. In the selectable one-way clutch disclosed in Japanese Laid-open Patent Publication No. 2015-077846, however, there is a risk where the lubricant oil is collected within the notch and the strut is pushed back by the lubricant oil within the notch when attempting to rise, whereby the strut is not successfully engaged with the notch.

It is an object of the present disclosure to at least partially solve the problem in the conventional technology.

SUMMARY

According to an embodiment of the present disclosure, a selectable one-way clutch includes: a pocket plate formed with a plurality of recessed receptacles on one face of the pocket plate; a notch plate arranged so as to oppose the face of the pocket plate on which the recessed receptacles are formed and capable of relatively rotating with respect to the pocket plate; an engagement recessed portion formed on a face of the notch plate corresponding to the recessed receptacle; a plate-shaped engagement piece received in the recessed receptacle; and an elastic member arranged between a bottom portion of the recessed receptacle and the engagement piece and biasing the engagement piece toward a side of the notch plate. Further an oil passage that discharges lubricant oil to a side of the recessed receptacle from a side of the engagement recessed portion is formed at the engagement piece. The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

A selectable one-way clutch (hereinafter, referred to as SOWC) according to embodiments of the disclosure will be described with reference to FIGS. 1 to 9. Note that the disclosure is not limited to the embodiments described below. In addition, components in the embodiments described below include components that can be replaced and easily replaced by those skilled in the art, or a substantially identical component.

Figure 1:
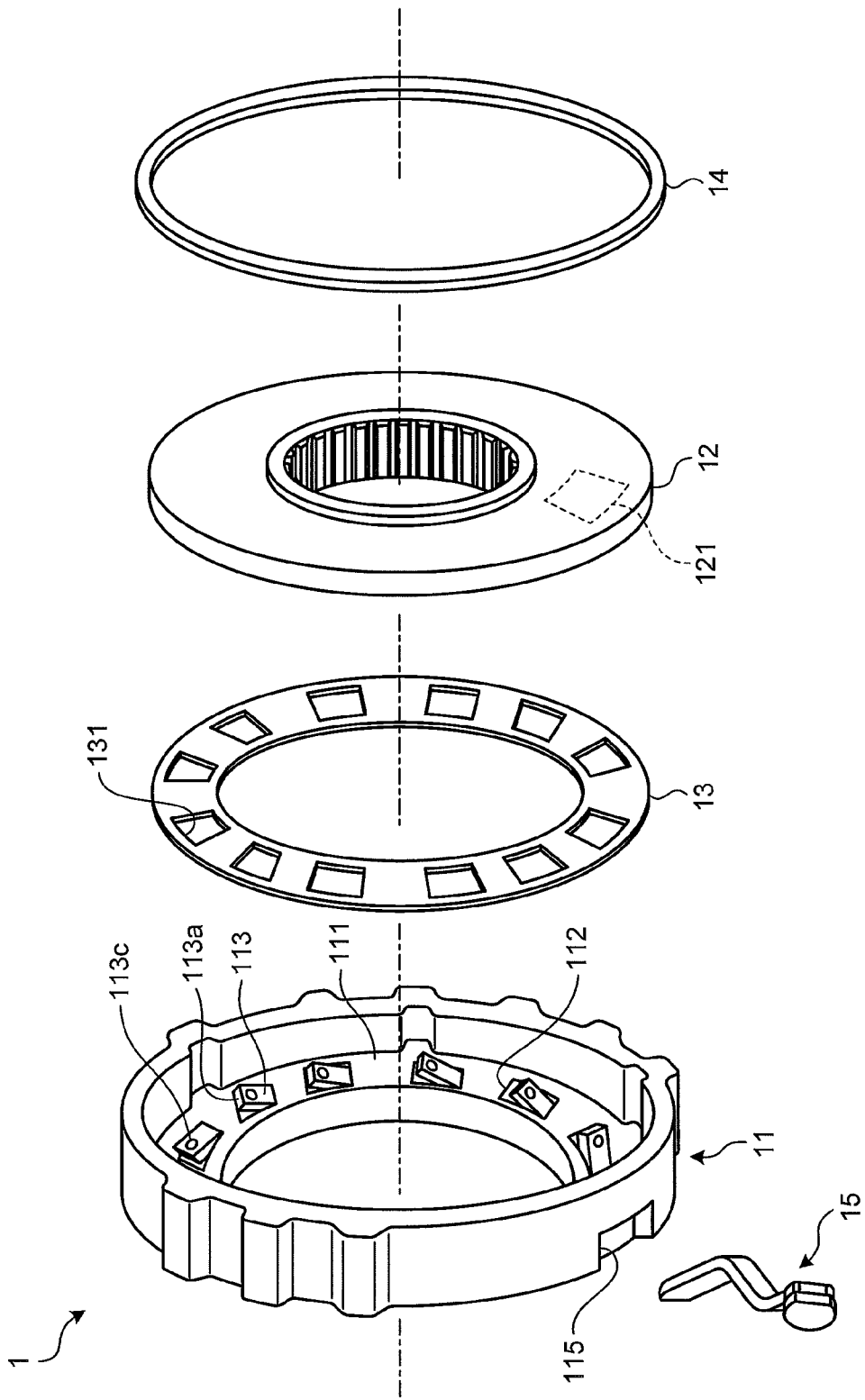
FIG. 1 is an exploded perspective view schematically illustrating a configuration of a selectable one-way clutch according to first to third embodiments of the present disclosure.

An SOWC 1, which may be used for a motive power transmission device in a vehicle or the like, is configured in such a manner that an engagement (locked) state and a non-engagement (unlocked) state are switched when a switching member (selector plate) is rotated by a predetermined angle. As illustrated in FIG. 1, the SOWC 1 includes a pocket plate 11, a notch plate 12, a selector plate 13, a snap ring 14, and an arm 15.

The pocket plate 11 is formed into a cylindrical shape as illustrated in FIG. 1, in which a flange portion 111 in a ring shape (hollow disc shape) extending toward an inner circumferential side is formed on one end of the cylinder in an axial line direction thereof. Additionally, the selector plate 13 and the notch plate 12 are arranged in this flange portion 111 in this order and the snap ring 14 is attached thereto in the last place, whereby the pocket plate 11, the selector plate 13, and the notch plate 12 are integrally assembled. Meanwhile, lubricant oil for lubrication is provided to the pocket plate 11, the selector plate 13, and the notch plate 12 between one another by a mechanical oil pump (not illustrated). The aforementioned "axial line" indicates a line depicted by a one-dot chain line in FIG. 1.

A cutout portion 115 is formed on an outer circumference of the pocket plate 11 as illustrated in FIG. 1. The arm 15 is inserted into this cutout portion 115, whereby the arm 15 and the selector plate 13 are coupled to each other.

As illustrated in FIG. 1, a plurality of pockets (recessed receptacles) 112 depressed in the axial line direction (plate thickness direction) is formed on one face of the pocket plate 11, specifically, a surface of the flange portion 111 opposing the selector plate 13, where a plate-shaped strut (engagement piece) 113 is received in the inside of each of these pockets. The pockets 112 are formed in the flange portion 111 in the same number as notches 121 in the notch plate 12 described later at positions corresponding to the notches 121. In addition; an elastic member 114 biasing the strut 113 toward a side of the notch plate 12 is arranged between a bottom portion of the pocket 112 and that strut 113 (refer to FIG. 4 described later).

The strut (engagement piece) 113 is arranged in the inside of each of the pockets 112. When the selector plate 13 is rotated, the strut 113 changes the condition thereof between a state where one end portion 113a thereof rises toward a side of the notch 121 while another end portion 113b thereof is received within the pocket 112 (for example, refer to FIG. 4 described later) and a state where both of the one end portion 113a and the another end portion 113b (that is, the entire strut 113) are received within the pocket 112 (for example, refer to FIG. 8 described later).

As illustrated in FIG. 1, the notch plate 12 is formed into a ring shape (hollow disc shape) having an outer diameter equal to that of the flange portion 111 of the pocket plate 11. In addition, the notch plate 12 is arranged opposing a face of the pocket plate 11 on which the pocket 112 is formed and configured so as to relatively rotate with respect to the pocket plate 11 about the axial line. A "movement direction" in FIG. 2 indicates a direction in which the notch plate 12 rotates during the engagement of the SOWC 1 (the same applies to FIGS. 4 and 8).

As illustrated in FIG. 1, the plurality of notches (engagement recessed portions) 121 depressed in the axial line direction (plate thickness direction) is formed on a surface of the notch plate 12 opposing the pocket plate 11 (pockets 112) out of surfaces thereof. The notch 121 is a recessed portion into which the one end portion 113a of the strut 113 is caused to be introduced while the strut 113 rises toward a side of the notch 121 through a window hole 131 in the selector plate 13. One notch 121 alone is illustrated in FIG. 1, but actually, the notches 121 are formed at positions corresponding to the pockets 112 and the struts 113 in the same number as the number thereof.

As illustrated in FIG. 1, the selector plate (switching member) 13 is formed into a ring shape (hollow disc shape) having an outer diameter and an inner diameter equal to those of the flange portion 111 of the pocket plate 11. In addition; the selector plate 13 is arranged opposing each of the pocket plate 11 and the notch plate 12 and capable of rotating about the axial line by a predetermined angle coaxially with the pocket plate 11 and the notch plate 12. Meanwhile, the window hole 131 passing through the selector plate 13 in the axial line direction (plate thickness direction) is formed in the selector plate 13 at a position corresponding to the pocket 112 and the strut 113 in the pocket plate 11.

As illustrated in FIG. 1, the window holes 131 are formed at positions corresponding to the pockets 112 and the struts 113 in the same number as the number thereof. When the window hole 131 is located in line with the position of the strut 113, the one end portion 113a of the strut 113 is pushed by the elastic member 114 (refer to FIG. 4) so as to rise toward the side of the notch plate 12 through the window hole 131, whereby the engagement state in which the one end portion 113a is engaged with the notch 121 is obtained.

On the other hand, when the window hole 131 is shifted relative to the position of the strut 113, the pocket 112 is shut out with a portion of the selector plate 13 where the window hole 131 is not formed such that the entire strut 113 is pushed into the inside of the pocket 112 by the selector plate 13, whereby the non-engagement state is obtained.

The aforementioned "engagement state" indicates (refers to) a state where the strut 113 in the pocket plate 11 and the notch 121 in the notch plate 12 are engaged with each other such that torque is transmitted between the pocket plate 11 and the notch plate 12. In this engagement state, the notch plate 12 can rotate solely in any one direction relative to the pocket plate 11 and cannot rotate in the other direction.

In contrast to this, the aforementioned "non-engagement state" indicates (refers to) a state where the engagement between the strut 113 in the pocket plate 11 and the notch 121 in the notch plate 12 is released and accordingly, torque is not transmitted between the pocket plate 11 and the notch plate 12. In this non-engagement state, the notch plate 12 can rotate in any direction relative to the pocket plate 11.

As described above, the snap ring 14 is used to integrally assemble the pocket plate 11, the selector plate 13, and the notch plate 12 and formed into a ring shape (hollow disc shape) having an outer diameter equal to that of the flange portion 111 of the pocket plate 11 as illustrated in FIG. 1.

The arm 15 is configured to transmit drive power from an external actuator to the selector plate 13. As illustrated in FIG. 1, the arm 15 is inserted into the cutout portion 115 of the pocket plate 11 to be coupled to the selector plate 13. In addition, a distal end of the arm 15 exposed from the cutout portion 115 is coupled to the actuator (not illustrated) such that the arm 15 is moved by that actuator during driving to cause the selector plate 13 to rotate.

Figure 2:
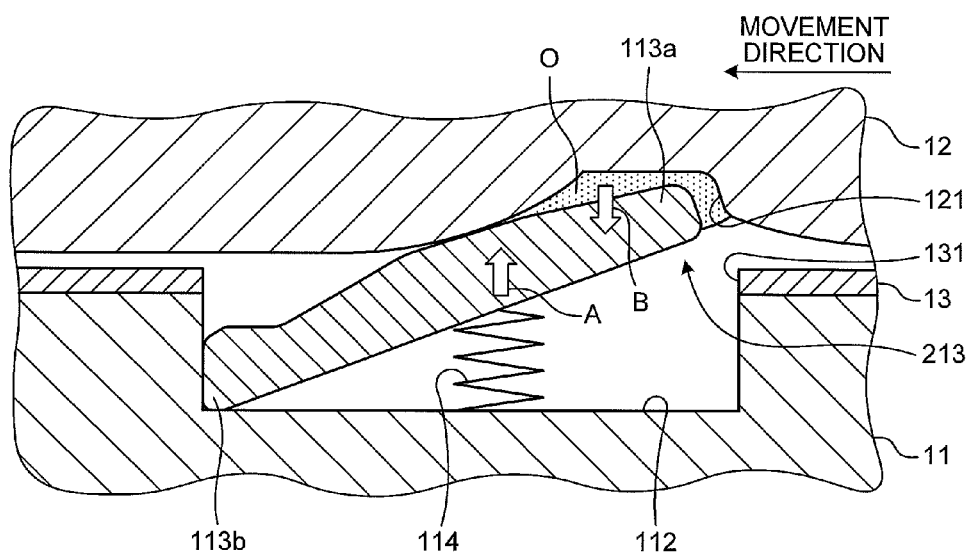
FIG. 2 is a cross-sectional view schematically illustrating a configuration of a selectable one-way clutch according to a conventional technique.

Here, as illustrated in FIG. 2, when a strut 213 attempts to rise in a direction indicated by an arrow A because of action by the elastic member 114 in a conventional SOWC, as described earlier, the strut 213 is pushed back by lubricant oil O collected (remained) within the notch 121 in a direction for releasing the engagement of the strut 213 as indicated by an arrow B. As a result, rising of the strut 213 is impeded (prevented). Accordingly, the strut 213 and the notch 121 are not successfully engaged with each other, causing a risk of the occurrence of an engagement error.

Figure 3:
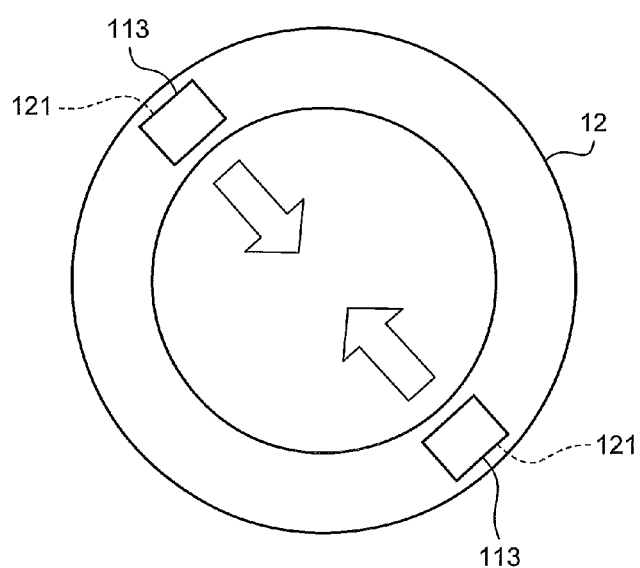
FIG. 3 is a conceptual diagram for explaining a radial load acting on the selectable one-way clutch.

Additionally, as illustrated in a conceptual diagram in FIG. 3, in a case where the strut 113 is engaged with the notch 121, for example, at two positions opposing each other in a diameter direction (mesh in two teeth), loads (radial loads)acted on the respective engagement positions in the diameter direction are balanced, whereby a resultant force of the radial loads becomes zero. Compared to this, in a case where the strut 213 and the notch 121 are not successfully engaged with each other as in the conventional SOWC (refer to FIG. 2), the engagement at two positions opposing each other in the diameter direction cannot be obtained and consequently, a situation such as the engagement at one position alone (mesh in one tooth) is caused. In this case, the radial loads at respective engagement positions are no longer balanced, causing a possibility of an excessive radial load being applied to a component such as a bearing. In order to solve such a problem, it is also possible to reduce the amount of oil supplied to the SOWC. In this case, however, there is a difficulty that burn-in of a component such as a gear and a bearing occurs due to a decrease in oil amount.

Figure 4:
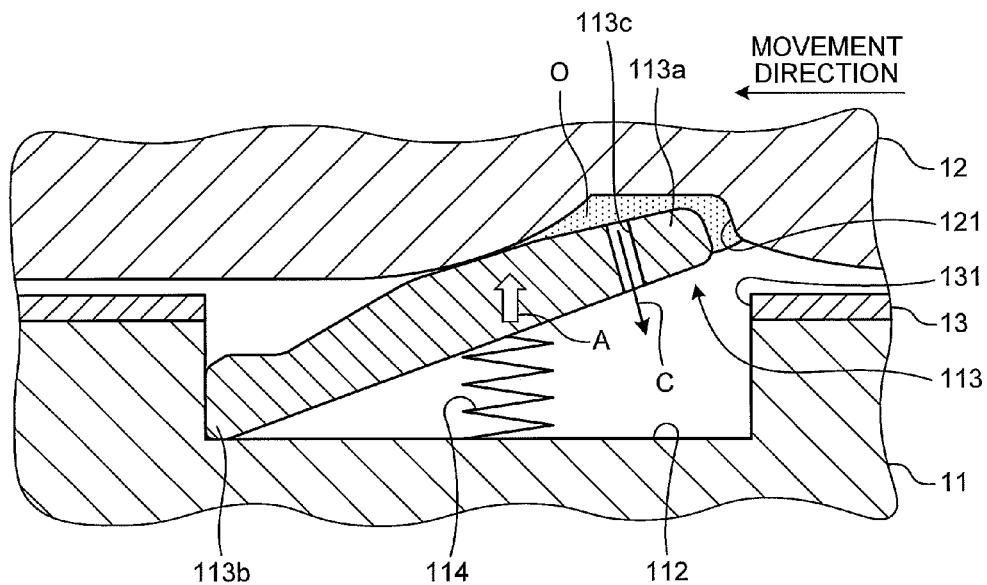
FIG. 4 is a cross-sectional view schematically illustrating a configuration of a selectable one-way clutch according to the first embodiment of the disclosure.

For a solution to this, the SOWC 1 according to the embodiment is provided with an oil passage at the strut 113, which discharges the lubricant oil O within the notch 121 to the side of the pocket 112 from the side of the notch 121 in order to suppress the engagement error between the pocket plate 11 and the notch plate 12. Specifically, as illustrated in FIG. 4, the SOWC 1 is formed with a through hole 113c passing through the strut 113 in the plate thickness direction thereof. As indicated by an arrow C in FIG. 4, by providing such the through hole 113c, the lubricant oil O collected within the notch 121 can be discharged to the outside of the notch 121, that is, the side of the pocket 112 with the strut 113 interposed therebetween.

Figure 5:
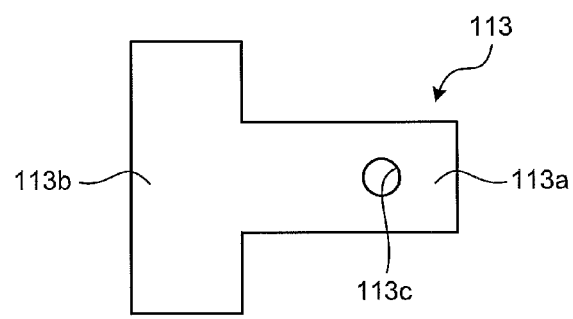
FIG. 5 is a plan view illustrating a first working example of a strut applicable to the selectable one-way clutch according to the first embodiment of the disclosure.

The through hole 113c is formed to have a circular-shaped cross-section when viewed from above as illustrated in FIG. 5. In addition, the through hole 113c is formed at a position in the one end portion 113a of the strut 113 which is, as illustrated in FIG. 4, introduced into the inside of the notch 121 when this one end portion 113a rises (a position where the through hole 113c makes contact with the lubricant oil O). The plurality of through holes 113c may be formed at the strut 113.

In the SOWC 1 having the configuration as described above, when the strut 113 rises to be engaged with the notch 121, the lubricant oil O collected within the notch 121 is discharged to the outside of the notch 121 through the oil passage formed at the strut 113, namely, the through hole 113c. Accordingly, the amount of the lubricant oil O within the notch 121 preventing the strut 113 from rising is reduced, whereby an error while the strut 113 is rising is suppressed and a possibility of the engagement error is lowered. As a result, the engagement error between the pocket plate 11 and the notch plate 12 can be suppressed.

Figure 6:
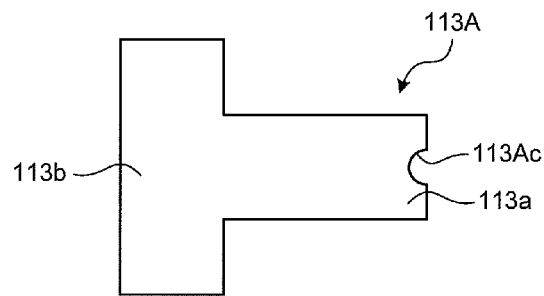
FIG. 6 is a plan view illustrating a second working example of the strut applicable to the selectable one-way clutch according to the first embodiment of the disclosure.
Figure 7:
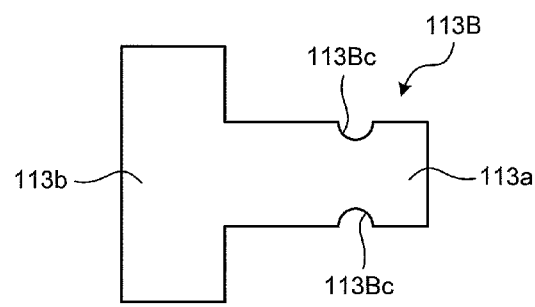
FIG. 7 is a plan view illustrating a third working example of the strut applicable to the selectable one-way clutch according to the first embodiment of the disclosure.
Figure 8:
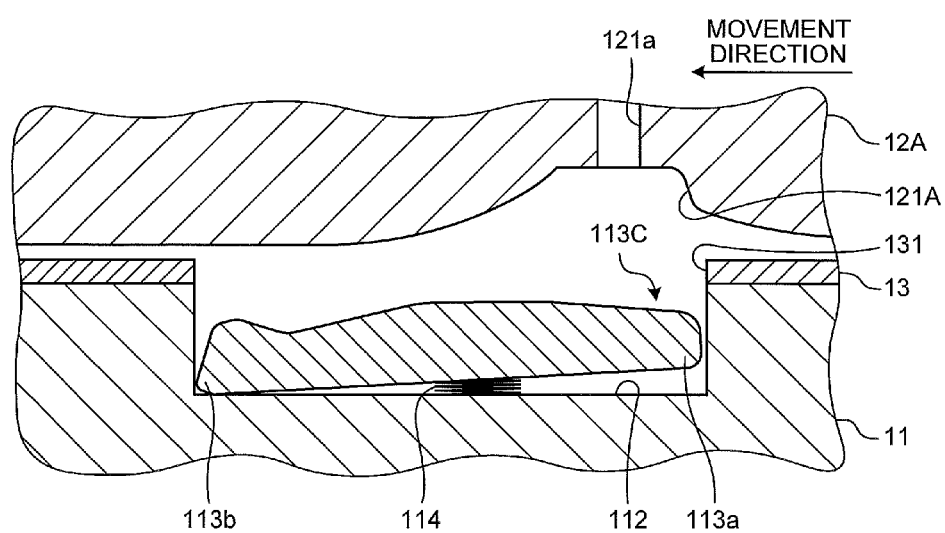
FIG. 8 is a cross-sectional view schematically illustrating a configuration of a selectable one-way clutch according to the second embodiment of the disclosure.

Here, the oil passage formed at the strut is not limited solely to the through hole 113c having a circular-shaped cross-section as illustrated in FIG. 5 as long as the oil passage is capable of discharging the lubricant oil O within the notch 121 to the side of the pocket 112 from the side of the notch 121. For example, as illustrated in FIGS. 6 and 7, cutouts 113Ac and 113Bc may be formed at peripheral edge portions of struts 113A and 113B, respectively, as the oil passages. Specifically, the cutout 113Ac illustrated in FIG. 6 is formed at a distal end of the one end portion 113a of the strut 113A. Meanwhile, specifically, the cutouts 113Bc illustrated in FIG. 7 are formed at both sides of the one end portion 113a of the strut 113B in a width direction. As described above, the cutouts 113Ac and 113Bc are formed at positions on sides of the one end portions 113a of the struts 113A and 113B, respectively, where the cutouts 113Ac and 113Bc make contact with the lubricant oil O within the notches 121 when the struts 113A and 113B rise. With such configurations, the lubricant oil O collected within the notches 121 is discharged to the outside of the notches 121 through the cutouts 113Ac and 113Bc.

The oil passage that discharges the lubricant oil O within the notch 121 to the outside of the notch 121 may also be provided at the notch plate 12. For example, according to an embodiment illustrated in FIG. 8, a through hole 121a passing through a notch plate 12A in the plate thickness direction thereof from a bottom portion of a notch 121A is formed as the oil passage. Accordingly, lubricant oil O collected within the notch 121A can be discharged to the outside of the notch 121A, that is, the opposite side of a strut 113C in the notch plate 12A (the outside of an SOWC 1). The through hole 121a is formed to have, for example, a circular-shaped cross-section as in the aforementioned through hole 113c. With such a configuration, the lubricant oil O collected within the notch 121A is discharged to the outside of the notch 121A through the through hole 121a.

Figure 9:
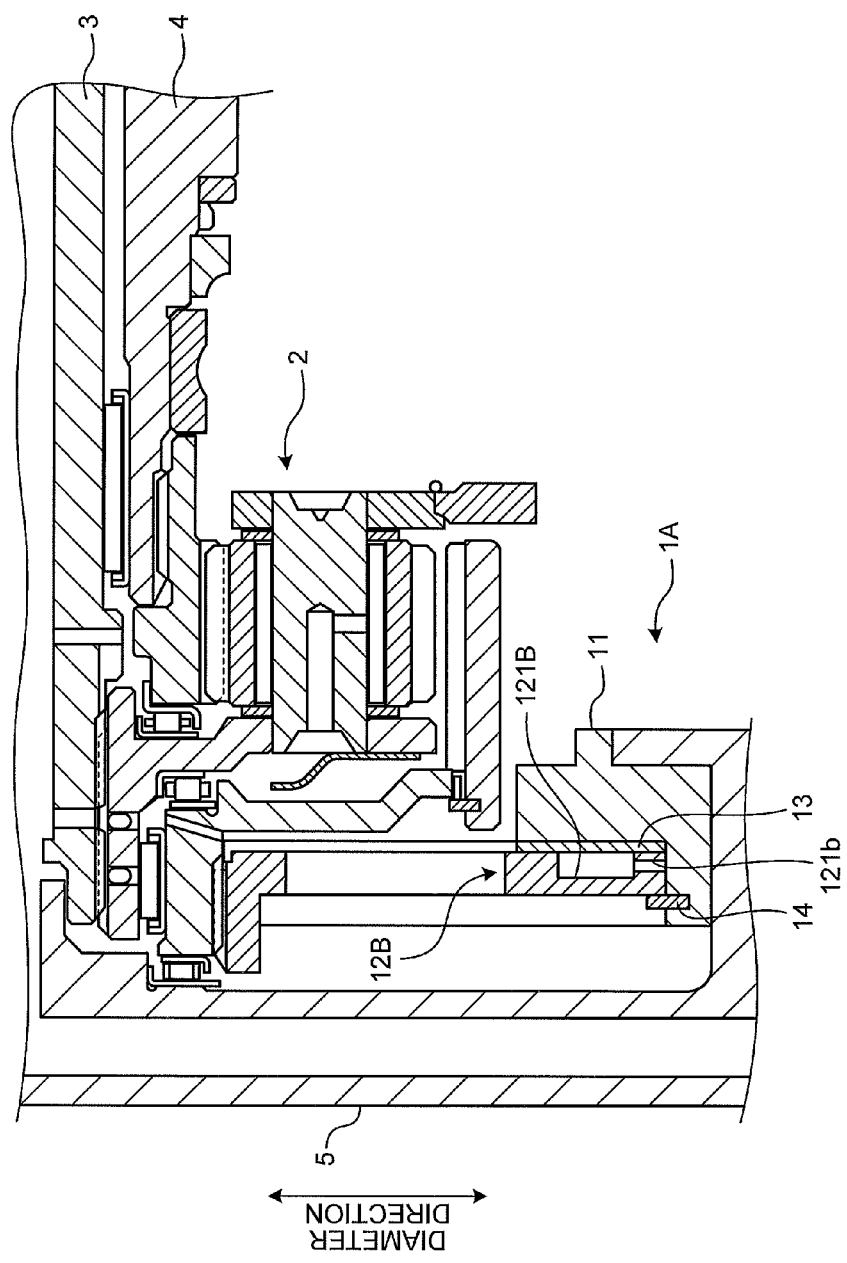
FIG. 9 is a cross-sectional view schematically illustrating a configuration of a motive power transmission device including a selectable one-way clutch according to the third embodiment of the disclosure.

Meanwhile, in an SOWC 1A illustrated in FIG. 9, a through hole 121b passing through a notch plate 12B in the diameter direction thereof from an outer circumference side of the notch plate 12B, that is, a lateral surface portion of a notch 121B is formed as the oil passage. Accordingly, lubricant oil O collected within the notch 121B can be discharged to the outside of the notch 121B, that is, the outer circumference side of the notch plate 12B. The through hole 121b is formed to have, for example, a circular-shaped cross-section as in the aforementioned through hole 113c. With such a configuration, the lubricant oil O collected within the notch 121B is discharged to the outside of the notch 121B through the through hole 121b.

In FIG. 9, the reference numeral 2 represents a planetary gear mechanism, the reference numeral 3 represents an input shaft to which motive power from an engine (not illustrated) is input, the reference numeral 4 represents a rotor shaft of a motor (not illustrated), and the reference numeral 5 represents a rear case for receiving the respective elements.

With the selectable one-way clutch according to the disclosure, the lubricant oil collected within the engagement recessed portion can be discharged to the outside of the engagement recessed portion and thus, the engagement error between the pocket plate and the notch plate can be suppressed.

In the selectable one-way clutch according to an embodiment, the lubricant oil collected within the engagement recessed portion is discharged to the outside of the engagement recessed portion through the oil passage formed at the engagement piece when the engagement piece rises to be engaged with the engagement recessed portion. Accordingly, the amount of the lubricant oil within the engagement recessed portion preventing the engagement piece from rising is reduced, whereby an error while the engagement piece is rising is suppressed and a possibility of an engagement error is lowered. In the selectable one-way clutch according to an embodiment, the lubricant oil collected within the engagement recessed portion is discharged to the outside of the engagement recessed portion through the through hole formed at the engagement piece when the engagement piece rises to be engaged with the engagement recessed portion.

In the selectable one-way clutch according to an embodiment, the lubricant oil collected within the engagement recessed portion is discharged to the outside of the engagement recessed portion through the cutout formed at the engagement piece when the engagement piece rises to be engaged with the engagement recessed portion. In the selectable one-way clutch according to an embodiment, the lubricant oil collected within the engagement recessed portion is discharged to the outside of the engagement recessed portion through the oil passage formed at the engagement recessed portion when the engagement piece rises to be engaged with the engagement recessed portion. Accordingly, the amount of the lubricant oil within the engagement recessed portion preventing the engagement piece from rising is reduced, whereby an error while the engagement piece is rising is suppressed and a possibility of an engagement error is lowered.

In the selectable one-way clutch according to an embodiment, the lubricant oil collected within the engagement recessed portion is discharged to the outside of the engagement recessed portion through the through hole formed at the engagement recessed portion when the engagement piece rises to be engaged with the engagement recessed portion.

In the selectable one-way clutch according to an embodiment, the lubricant oil collected within the engagement recessed portion is discharged to the outside of the engagement recessed portion through the through hole formed at the engagement recessed portion when the engagement piece rises to be engaged with the engagement recessed portion.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A selectable one-way clutch comprising:
   a pocket plate formed with a plurality of recessed receptacles on one face of the pocket plate;
   a notch plate arranged so as to oppose the face of the pocket plate on which the recessed receptacles are formed and capable of relatively rotating with respect to the pocket plate;
   an engagement recessed portion formed on a face of the notch plate corresponding to the recessed receptacle;
   a plate-shaped engagement piece received in the recessed receptacle; and
   an elastic member arranged between a bottom portion of the recessed receptacle and the engagement piece and biasing the engagement piece toward a side of the notch plate, wherein
   the engagement piece includes a one end portion, which rises towards a side of the engagement recessed portion, and an another end portion, which is received within the recessed receptacle when the selectable one-way clutch is engaged,
   the one end portion is disposed on a side opposite to a side of the another end portion in a longitudinal direction of the engagement piece and with respect to a center portion of the engagement piece, and
   an oil passage that discharges lubricant oil to a side of the recessed receptacle from a side of the engagement recessed portion is formed at the engagement piece, wherein
   the engagement piece engages with the engagement recessed portion by raising the one end portion, and
   the oil passage is formed at a position in the one end portion where the oil passage is introduced within the engagement recessed portion when the end portion rises.

2. The selectable one-way clutch according to claim 1, wherein the oil passage is a through hole passing through the engagement piece in a plate thickness direction of the engagement piece.

3. A selectable one-way clutch comprising:
   a pocket plate formed with a plurality of recessed receptacles on one face of the pocket plate;
   a notch plate arranged so as to oppose the face of the pocket plate on which the recessed receptacles are formed and capable of relatively rotating with respect to the pocket plate;
   an engagement recessed portion formed on a face of the notch plate corresponding to the recessed receptacle;
   a plate-shaped engagement piece received in the recessed receptacle; and
   an elastic member arranged between a bottom portion of the recessed receptacle and the engagement piece and biasing the engagement piece toward a side of the notch plate, wherein
   an oil passage that discharges lubricant oil to a side of the recessed receptacle from a side of the engagement recessed portion is formed at the engagement piece, wherein the oil passage is a cutout formed on a peripheral edge portion of the engagement piece.

4. A selectable one-way clutch comprising:
   a pocket plate formed with a plurality of recessed receptacles on one face of the pocket plate;
   a disc-shaped notch plate arranged so as to oppose the face of the pocket plate on which the recessed receptacles are formed and capable of relatively rotating with respect to the pocket plate;
   an engagement recessed portion formed on a face of the notch plate corresponding to the recessed receptacle;
   a plate-shaped engagement piece received in the recessed receptacle; and
   an elastic member arranged between a bottom portion of the recessed receptacle and the engagement piece and biasing the engagement piece toward a side of the notch plate, wherein
   an oil passage that discharges lubricant oil to the outside is formed at the engagement recessed portion.

5. The selectable one-way clutch according to claim 4, wherein the oil passage is a through hole passing through the notch plate in a plate thickness direction of the notch plate.

6. The selectable one-way clutch according to claim 4, wherein the oil passage is a through hole passing through the notch plate in a diameter direction of the notch plate.

* * * * *